(12) United States Patent
Aokage

(10) Patent No.: US 9,025,048 B2
(45) Date of Patent: May 5, 2015

(54) IMAGE PROCESSING APPARATUS AND METHOD OF CONTROLLING THE SAME

(71) Applicant: Canon Kabushiki Kaisha, Tokyo (JP)

(72) Inventor: Hironori Aokage, Yashio (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/960,322

(22) Filed: Aug. 6, 2013

(65) Prior Publication Data

US 2013/0321666 A1 Dec. 5, 2013

Related U.S. Application Data

(63) Continuation of application No. PCT/JP2013/002449, filed on Apr. 10, 2013.

(30) Foreign Application Priority Data

Apr. 11, 2012 (JP) ................................. 2012-090454

(51) Int. Cl.
| | |
|---|---|
| *H04N 9/68* | (2006.01) |
| *H04N 5/225* | (2006.01) |
| *H04N 5/235* | (2006.01) |
| *H04N 5/232* | (2006.01) |
| *H04N 1/60* | (2006.01) |
| *H04N 101/00* | (2006.01) |

(52) U.S. Cl.
CPC ......... *H04N 5/2351* (2013.01); *H04N 5/23245* (2013.01); *H04N 2101/00* (2013.01); *H04N 1/6027* (2013.01)

(58) Field of Classification Search
CPC .......................... H04N 5/2351; H04N 5/23245
See application file for complete search history.

(56) References Cited

U.S. PATENT DOCUMENTS

| | | | | |
|---|---|---|---|---|
| 5,126,646 | A | * | 6/1992 | Fujita et al. ................... 318/569 |
| 5,126,846 | A | * | 6/1992 | Niimura ........................ 348/613 |
| 6,646,246 | B1 | * | 11/2003 | Gindele et al. ............. 250/208.1 |
| 6,867,717 | B1 | * | 3/2005 | Ion et al. ....................... 341/118 |
| 8,228,397 | B2 | * | 7/2012 | Katagiri et al. ............. 348/222.1 |
| 8,279,308 | B1 | * | 10/2012 | Borg ............................. 348/255 |
| 2006/0158529 | A1 | * | 7/2006 | Katagiri ..................... 348/222.1 |

FOREIGN PATENT DOCUMENTS

| | | |
|---|---|---|
| JP | 2002-084455 A | 3/2002 |
| JP | 2008-245246 A | 10/2008 |
| JP | 2009-017156 A | 1/2009 |
| JP | 2010-039758 A | 2/2010 |

* cited by examiner

*Primary Examiner* — Trung Diep
(74) *Attorney, Agent, or Firm* — Cowan, Liebowitz & Latman, P.C.

(57) ABSTRACT

In an image capture apparatus and a method of controlling the apparatus which can apply image correction processing which influences the contrast of a shot image, image quality degradation of an image shot by using input-output characteristics where an output value logarithmically increases with a linear increase in input value is suppressed. When using input-output characteristics where an output value logarithmically increases with a linear increase in input value (S101), internal functional blocks are controlled to invalidate image correction functions which influence the tone characteristics or contrast of an image (S103).

12 Claims, 7 Drawing Sheets

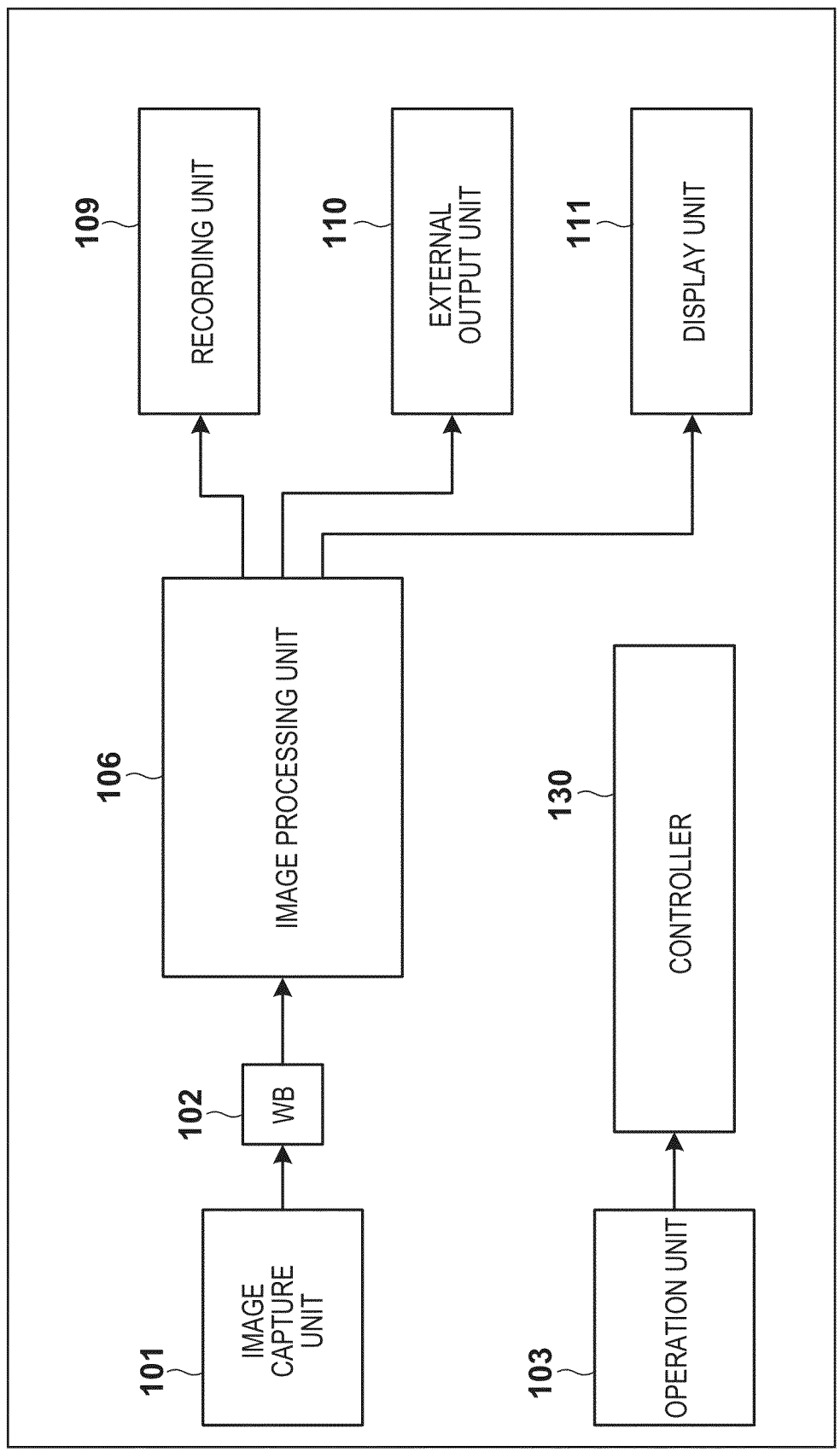

IMAGE PROCESSING APPARATUS AND METHOD OF CONTROLLING THE SAME

CROSS-REFERENCE TO RELATED APPLICATIONS

This application is a continuation of International Application No. PCT/JP2013/002449, filed Apr. 10, 2013 the entire disclosure of which is hereby incorporated by reference.

BACKGROUND OF THE INVENTION

1. Field of the Invention

The present invention relates to an image capture apparatus and a method of controlling the same.

2. Description of the Related Art

Conventionally, video cameras and still cameras have differed in many respects. The former apparatuses have been apparatuses designed to capture only moving images, whereas the latter apparatuses have been apparatuses designed to capture only still images. However, both the types of apparatuses have started using image sensors and have digitally processed images. This has been reducing the differences between them. Recently, the still image shooting function of a video camera and the movie shooting function of a still camera have greatly advanced from the initial levels to such an extent that even a compact still camera like that built in a cellular phone can perform movie shooting with a full HD (high definition) resolution.

Recently, in particular, since a digital still camera with interchangeable lenses has also been equipped with a movie shooting function, movie shooting by the still camera has attracted a great deal of attention. This may be because a digital still camera with interchangeable lenses uses a large-sized image sensor with a large number of pixels, interchanging lenses facilitates changing the angle of view, and allows still image shooting with high image quality.

When performing shooting operation premised on being subjected to editing as in the case of movies and television, the apparatus performs recording with importance being attached to tone gradation to minimize blown-out highlights and blocked-up shadows so as to ensure an adjustable range at the time of editing. More specifically, it is known that recording is performed by using nonlinear input-output characteristics (called Log gamma) that exhibit a logarithmic increase with an increase in luminance value. Such nonlinear input-output characteristics are called Log or Log gamma and defined as a function or table. In addition, further converting film scan data, converted by the defined Log gamma, by using Cineon LOG or the like proposed for film scan data recording proposed by Kodak, U.S.A. allows the data to be handled as image data similar in characteristic to the photosensitivity of a photograph film. Using Log gamma can maintain high tone gradation by suppressing blown-out highlights and blocked-up shadows. However, the recorded moving image becomes a low-contrast image, with a dark portion becoming brighter and a bright portion becoming darker. For this reason, this image is not suitable for appreciation without any change, and hence needs to be converted into linear tone characteristics with respect to human visual features in the end.

In television or movie production, moving images having Log gamma characteristics are generally edited. Conventionally, however, the movie shooting function of a digital still camera is designed to record moving images converted into images having tone characteristics or contrast suitable for appreciation without any editing processing after shooting operation (to be referred to as postproduction processing). For this reason, digital still cameras have also been required to support movie recording using Log gamma.

However, problems arise when the movie shooting function of a digital still camera is configured to allow the application of Log gamma. Although having the movie shooting function, the digital still camera is still an apparatus mainly designed for still image recording. Unlike moving images, still images each are obtained by capturing a moment and are appreciated on a screen or in the form of a print. For this reason, various types of image correction functions for image formation are prepared to obtain shooting results reflecting the intentions of a photographer.

As a typical image correction function, there is available a function of performing the processing of converting image characteristics such as hue and saturation with image processing parameters in accordance with a shooting scene (Japanese Patent Laid-Open No. 2008-245246). For example, color correction is performed to, for example, obtain results similar to memory colors by enhancing the reddish color of a sunset in an evening scene and enhancing the vividness of blue and green in a landscape scene, and obtain a healthy skin color in a portrait. It is also known that automatic tone correction is performed in accordance with the luminance of an image in a shooting scene (Japanese Patent Laid-Open No. 2010-39758).

These image correction functions influence the tone characteristics or contrast of an image (change the tone characteristics or contrast). In addition, the circuit for performing image processing is common to still images and moving images, and hence the image correction functions are also applied to moving images. However, these image correction functions should not be applied to moving images shot by applying Log gamma. This is because an apparatus designed to perform editing processing after shooting (to be referred to as postproduction processing) is premised on the input of images having the Log gamma characteristics defined on the camera side. When, however, receiving an image having undergone the above image correction, the apparatus handles the image having unexpected characteristics. This may cause degradation in the image quality of the edited image.

SUMMARY OF THE INVENTION

In an image capture apparatus and a method of controlling the apparatus which can apply image correction processing which influences the contrast of a shot image, the present invention is configured to suppress the formation of an unintended image different from an image suitable for viewing by the user from an image shot by using input-output characteristics defined by numerical values where an output value logarithmically increases with a linear increase in input value.

According to an aspect of the present invention, there is provided an image capture apparatus comprising: a conversion unit that converts an output from an image sensor with nonlinear input-output characteristics and outputting a converted output; an image processing unit that applies image correction processing which changes tone characteristics or contrast to the output from the conversion unit; and a control unit that controls validity/invalidity of the image processing unit in accordance with the input-output characteristics used by the conversion unit, wherein the control unit invalidates the image processing unit when the conversion unit is set to use input-output characteristics where an output value logarithmically increases with a linear increase in input value.

According to another aspect of the present invention, there is provided a method of controlling an image capture apparatus, wherein the image capture apparatus includes: a conversion unit that converts an output from an image sensor with nonlinear input-output characteristics and outputs a converted output, and an image processing unit that applies image correction processing which changes tone characteristics or contrast to the output from the conversion unit, the method comprising a control step of controlling validity/invalidity of the image processing unit in accordance with the input-output characteristics used by the conversion unit, wherein in the control step, if the conversion unit is set to use input-output characteristics where an output value logarithmically increases with a linear increase in input value, the image processing unit is invalidated.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments of the invention and, together with the description, serve to explain the principles of the present invention.

FIG. 1 is a block diagram showing an example of the arrangement of a digital still camera as an example of an image capture apparatus according to an embodiment of the present invention;

DESCRIPTION OF THE EMBODIMENTS

The exemplary embodiments of the present invention will be described below with reference to the accompanying drawings.

FIG. 1 is a block diagram showing an example of the arrangement associated with image capturing, developing, and outputting in a digital still camera 100 (to be simply referred to as a digital camera hereinafter) as an example of an image capture apparatus according to an embodiment of the present invention. A controller 130 includes a CPU and memories such as a ROM and a RAM. The controller 130 controls each unit described below and implements part or all of the function of each unit. Note that at least part of the arrangement described below may be implemented by the CPU of the controller 130 in a software manner, or hardware, or cooperation between hardware and software.

Figure 2A:
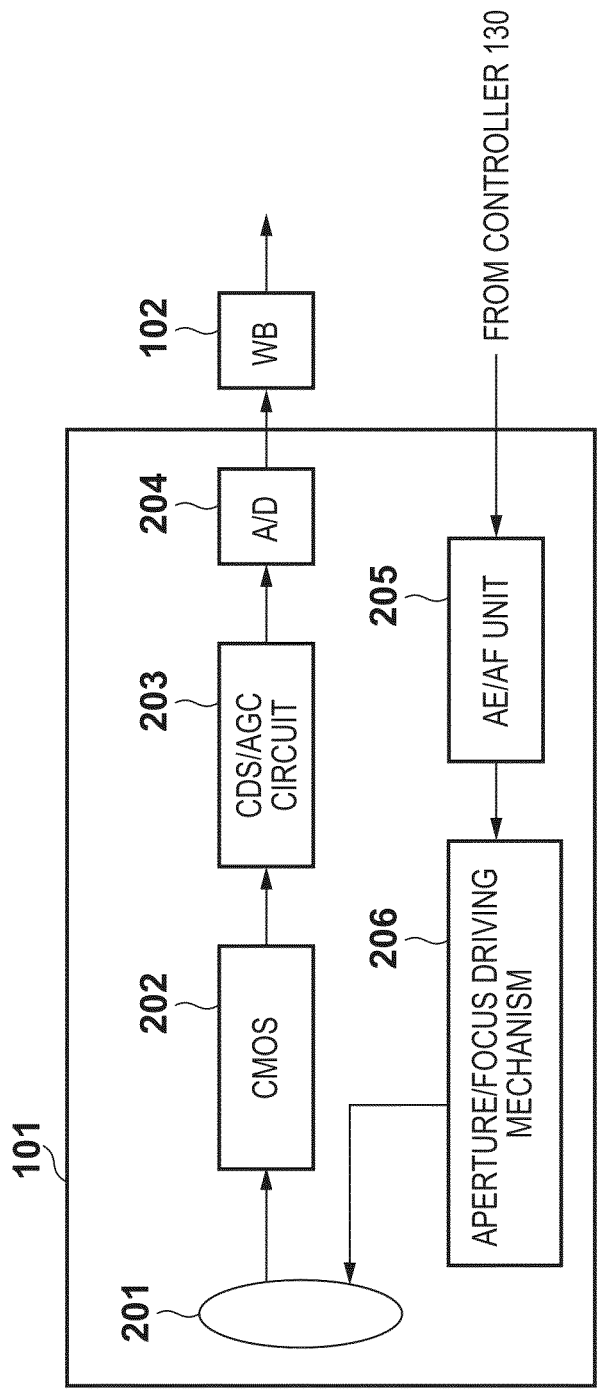
FIG. 2A is a block diagram showing the details of an image capture unit in FIG. 1.

An image capture unit 101 includes an imaging optical system and an image sensor. The image capture unit 101 converts an optical image formed on the image capture plane of the image sensor into an electrical signal, converts the acquired electrical signal into a digital signal, and outputs it. FIG. 2A shows an example of the arrangement of the image capture unit 101. Referring to FIG. 2A, an imaging optical system 201 forms an object image in its field of view (image capture range) onto the image capture plane of a CMOS 202 as an image sensor. Note that the image sensor to be used is not limited to a CMOS and may be another type of photoelectric conversion device such as a CCD.

A CDS/AGC circuit 203 performs correlated double sampling/gain adjustment for the electrical signals obtained from the CMOS 202. An A/D converter 204 digitally converts the signal output from the CDS/AGC circuit 203 and outputs the resultant signal as an image signal. The imaging optical system 201 includes a driving mechanism 206 for an aperture and a focus lens. An AE/AF unit 205 controls the driving mechanism 206 in accordance with an instruction from the controller 130. The console unit 205 and the driving mechanism 206 implement an automatic focus detection (AF) function and an automatic exposure control (AE) function.

Referring back to FIG. 1, a WB unit 102 performs white balance adjustment for the image signal output from the image capture unit 101 (A/D converter 204). The image signal whose white balance is adjusted by the WB unit 102 is supplied to an image processing unit 106. The detailed operation of the image processing unit 106 will be described later.

An operation unit 103 is an input device group including switches, buttons, keys, dial, touch panel with which the user inputs various types of settings and instructions to the digital still camera 100. Note that the operation unit 103 may use line-of-sight detection, speech recognition, and the like in addition to operation on physical mechanisms.

The operation unit 103 typically includes a release button, menu display button, arrow keys, decision/execution button, and shooting mode setting dial.

The controller 130 detects the operation of the operation unit 103 and controls the respective units so as to implement operations corresponding to detected operation contents. Note that the controller 130 displays a GUI screen such as a menu screen on a display unit 111 or displays setting information, shooting information, and the like of the digital still camera 100 on the display unit 111 upon superimposing them on the image for display output from the image processing unit 106.

Figure 2B:
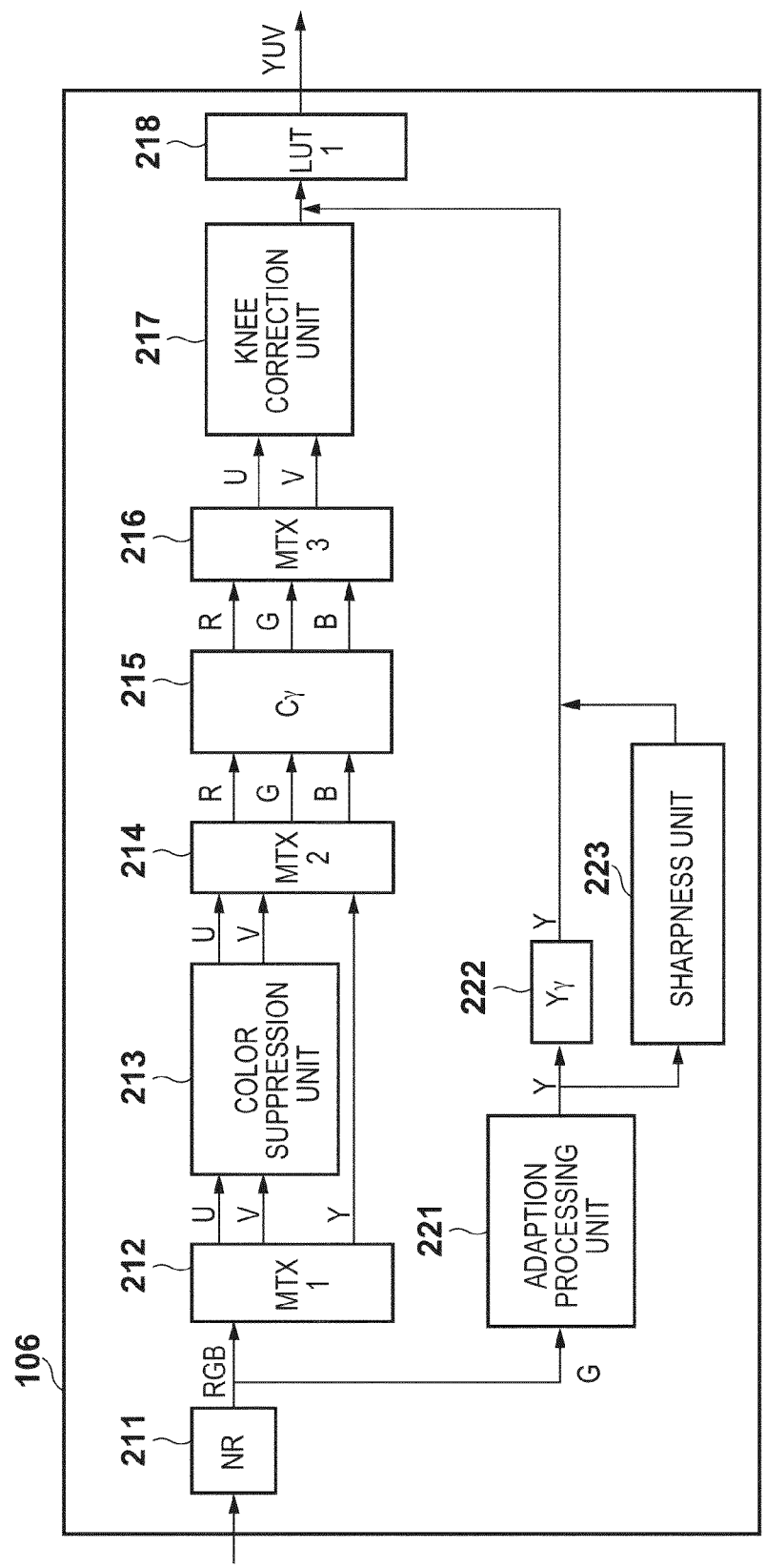
FIG. 2B is a block diagram showing the details of an image processing unit in FIG. 1.

FIG. 2B shows an example of the detailed functional arrangement of the image processing unit 106. A noise removal unit (NR) 211 applies noise removal processing to a white balance adjusted image signal. The chrominance signals and luminance signal of the image signal output from the noise removal unit 211 are concurrently processed. In the color processing unit, first of all, a first matrix (MTX) 212 converts the image signal (RGB) output from the noise removal unit 211 into a YUV signal. At this time, the first matrix 212 also performs matrix conversion so as to absorb variations due to the inherent spectral characteristics of the image sensor (CMOS) 202. A color suppression unit 213 adjusts (suppresses) the gain of the color value of a high-luminance portion to maintain white balance at the time of saturation.

A second matrix 214 converts the YUV signal including the UV signal processed by the color suppression unit 213 into an RGB signal for γ processing. A Cγ processing unit 215 performs γ processing for the image signal (RGB signal) obtained by the second matrix 214. A third matrix 216 converts the output (RGB signal) from the Cγ processing unit 215 into a YUV signal again. A knee correction unit 217 receives the UV signal of the YUV signal output from the third matrix 216 and compresses a high-saturation color space to make the image signal fall within a target color space.

On the other hand, the luminance processing unit receives the G component of the image signal (RGB) output from the noise removal unit 211. In the luminance processing unit, first of all, an adaption processing unit 221 generates a Y signal by performing adaption processing for a G signal to maintain a band. A Yγ processing unit 222 performs γ processing for the Y signal generated by the adaption processing unit 221. In addition, the output from the adaption processing unit 221 is supplied to a sharpness unit 223. The sharpness unit 223 detects a sharpness amount from the input Y signal and adds it to the output from the Yγ processing unit 222.

When converting a shot image by applying a gamma curve having nonlinear input-output characteristics including Log gamma, the controller 130 sets gamma characteristics (input-output characteristics) to be used for the Cγ processing unit 215 and the Yγ processing unit 222. As described above, Log gamma means nonlinear input-output characteristics where an output value logarithmically increases with a linear increase in input value, as shown in, for example, FIG. 5. That is, Log gamma is input-output characteristics represented by the following logarithmic equation:

output value=$A$×log 10($B$×input value+$C$)+$D$ where $0<A<1$ and B, C, and D are constants. Assume that in the case of 8-bit data, A=0.529136, B=10.1596, C=1.0, and D=0.0730597. This makes it possible to prevent blocked-up shadows of a dark portion in a slightly offset state, maintain the tone of an intermediate luminance portion at a minimum number of bits, and maintain the tone of a bright portion by preventing blown-out highlights up to saturation.

An output signal (U, V) from the knee correction unit 217 and the signal (Y) obtained by the luminance processing unit are supplied to a first lookup table (to be referred to as a first LUT) 218. The image processing unit 106 then generates a final YUV signal and outputs it.

Referring back to FIG. 1, a recording unit 109 removes noise by using, for example, the correlativity between the frames of an input YUV signal. Thereafter, the recording unit 109 generates an image file conforming to a preset recording file format (for example, Exif: Exchangeable image file format), together with additional information. The recording unit 109 then records the image file on a recording medium such as a memory card or hard disk.

An external output unit 110 generates a signal for outputting an image to the outside. In this case, the external output unit 110 generates a signal to be output to the outside via HDMI® (High-Definition Multimedia Interface). However, the external output unit 110 may generate signals conforming to other specifications. The external output unit 110 may convert a resolution as needed. When, for example, outputting a signal from HDMI, the external output unit 110 converts the resolution into any one of the resolutions specified by the HDMI specification (for example, 1920×1080 or 1280×720).

Figure 6:
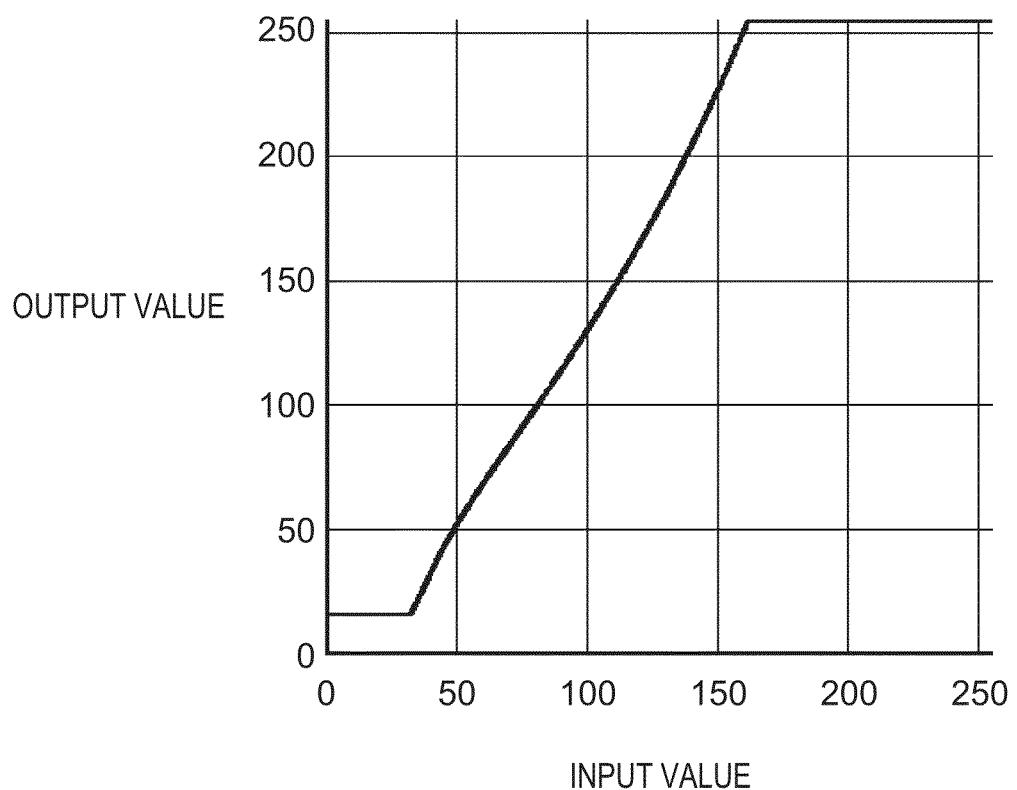
FIG. 6 is a graph showing the characteristics of a viewing LUT.

The display unit 111 generates a display image signal and causes the display apparatus (the LCD provided on the rear surface of the digital still camera 100 in this case) of the digital still camera 100 to display the image. The display unit 111 converts the resolution of an image into a resolution supported by the display apparatus, applies a LUT for tone correction to the image, and supplies the resultant data to the display apparatus, as needed. In this case, it is necessary to apply the LUT when monitoring the image obtained by movie shooting while applying Log gamma or when playing back a moving image shot by applying Log gamma. As described above, if the moving image shot by applying Log gamma is directly displayed, the shooting result cannot be properly evaluated. For this reason, the apparatus performs display operation by using a LUT for simulating a state in which processing is performed by applying gamma implementing linear tone or the like to visual properties. Such a LUT is called a viewing LUT. More specifically, this LUT has characteristics that increase the contrast of an intermediate luminance portion which has been suppressed by Log gamma, as shown in FIG. 6. This implements brightness conforming to a standard video color space (for example, BT.709). That is, the user checks the tone of an image before conversion with the viewing LUT at the time of shooting operation, and can perform shooting operation while picturing a final image in mind after conversion with the viewing LUT. The apparatus does not apply the viewing LUT to any image data obtained by using a gamma curve other than Log gamma. It is also possible to perform simulation by applying a gamma LUT corresponding to each environment.

Validity control and invalidity control on the image correction processing functions of the digital still camera 100 having the above arrangement will be described.

As described above, when Log gamma is set, the user may desire to perform recording operation with priority being given to post-editing. The user performs post-editing by using the numerical values defined by Log gamma. It is therefore preferable to perform recording while minimizing influences on outputs from the image sensor, especially contrast. On the other hand, the digital still camera 100 can set an image correction function influencing tone characteristics or contrast in accordance with a shooting scene.

This embodiment is characterized by invalidating image correction functions influencing the tone characteristics or contrast of an image when Log gamma is set. An image correction function is implemented by a combination of changes in parameter in a plurality of processing blocks and the like. In addition, influences on tone characteristics or contrast differ depending on the type of image correction function, correction level settings, and the like. On the other hand, the user sets an image correction function on a setting screen by selecting a desired shooting scene mode (an evening scene mode, portrait mode, scenery mode, or the like), validity (ON)/invalidity (OFF) of the function, "high, normal, or low", and the like. For this reason, the user cannot grasp which setting of which function has influence on tone characteristics or contrast.

In addition, Log gamma setting is valid only at the time of movie shooting, but image correction function setting is valid at the time of still image shooting and at the time of movie shooting (when gamma other than Log gamma is set). That is, settings which have been made at the time of still image shooting are also used at the time of movie shooting. That is, even if the user has no intention of setting an image correction function for movie shooting, the setting is reflected in movie shooting. This makes it possible to obtain moving and still images without any sense of strangeness even if, for example, the user performs still image shooting during movie recording. However, at movie shooting, the user friendliness deteriorates if the user needs to manually cancel the image correction function setting only when making Log gamma setting at the time of movie shooting. Furthermore, if there are a plurality of types of image correction functions which can be set, it may not be easy to cancel all the setting items while checking them. In addition, even if the user can properly cancel image correction function settings, he/she needs to make settings again when wanting to perform shooting using an image correction function at the time of canceling the use of Log gamma. This operation is very cumbersome.

An advantage of the digital still camera 100 is, in particular, that the user can easily switch between still image shooting and the movie shooting within the same apparatus. For example, a great merit of performing movie shooting using a digital camera is that the user can perform still image shooting with high image quality between movie shooting operations with the same camera when performing movie shooting using Log gamma premised on post-editing. However, when performing still image shooting and movie shooting (using Log gamma) while switching between them, it is not practical to repeatedly set and cancel image correction function settings.

For this reason, in this embodiment, the camera automatically invalidates image correction processing which influences the tone characteristics or contrast of an image (changes tone characteristics or contrast) when Log gamma is set. This allows the user to properly perform movie recording by performing movie shooting upon simply setting the use of Log gamma without being conscious of whether image correction processing to be canceled is set at the time of movie shooting operation applying Log gamma.

More specifically, the controller 130 can store, in a referenceable nonvolatile memory in advance, information indicating which kind of setting is made for which functional block upon setting of the use of Log gamma. For example, it is possible to store in advance information about functional blocks for which parameters should be initialized, parameters to be set at the time of use of Log gamma, information about setting destinations, and the like. When the user sets Log gamma, the controller 130 performs control such as setting/initialization and the like for necessary functional blocks based on these pieces of information. Alternatively, the controller 130 may store setting items associated with image correction processing which influences tone characteristics or contrast in advance and change set value concerning these setting items into set values which inhibit the execution of image correction processing at the time of using Log gamma.

Note that functional blocks whose settings are changed or whose processing is invalidated at the time of the setting of the use of Log gamma are not limited to functional blocks whose set values are changed in accordance with user settings. For example, sharpness processing for luminance values which is performed by the sharpness unit 223 is not directly relevant to the settings for image correction processing but influences the contrast of the image. For this reason, the controller 130 invalidates the sharpness unit 223 when the use of Log gamma is set.

The controller 130 may store, in a nonvolatile memory, the contents of settings associated with image correction processing which has been performed upon setting of the use of Log gamma and restore the settings associated with image correction processing based on the stored information when the use of Log gamma is canceled. This arrangement obviates the necessity to re-set the initial setting contents of image correction processing upon cancellation of the use of Log gamma, thereby greatly improving the user friendliness.

In addition, the user may select a normal shooting scene mode capable of still image shooting during movie shooting and a post-editing shooting mode dedicated to movie recording with the dial of the operation unit 103. If the scene mode selected by the user is the post-editing shooting mode dedicated to movie shooting, the controller 130 automatically applies Log gamma while inactivating image correction processing which influences tone characteristics or contrast so as to inhibit the execution of the processing. If the user selects the normal shooting scene mode, the controller 130 may inhibit the use of Log gamma and automatically set an image correction function which influences tone characteristics or contrast in accordance with a shooting scene. If the user uses Log gamma in the normal shooting scene mode, the controller 130 may perform the same processing as that described above.

As described above, when the user sets the use of Log gamma, the controller 130 controls predetermined functional blocks so as to invalidate an image correction function which influences the tone characteristics or contrast of an image while invalidating the setting items for the image correction function on the menu screen.

Figure 3:
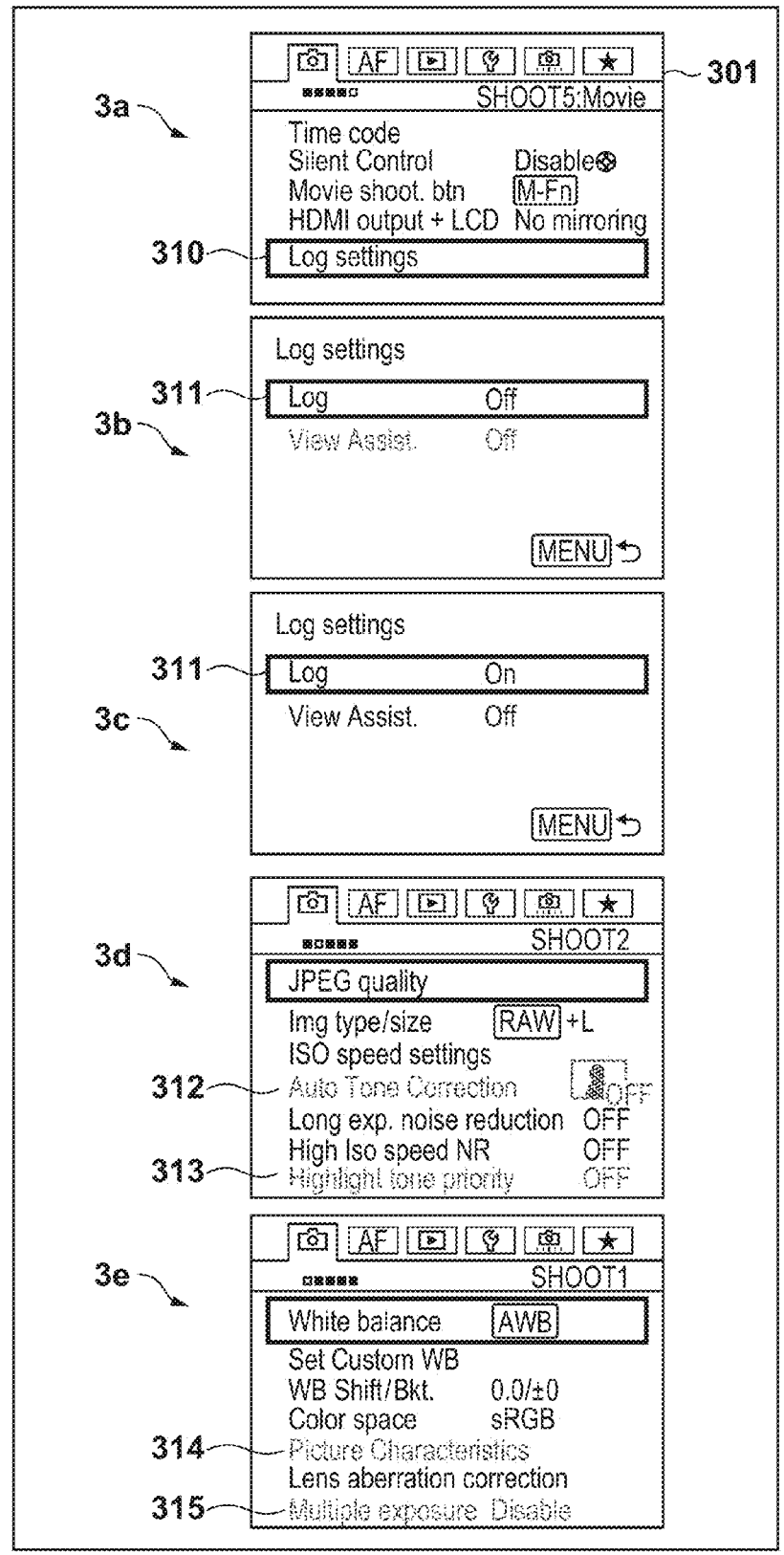
FIG. 3 is a view showing a display example of a menu screen in an embodiment of the present invention.

FIG. 3 shows an example of a menu screen of the digital still camera 100 according to this embodiment. The controller 130 causes the display unit 111 to display a menu screen 301 by using screen data stored in the nonvolatile memory in advance. In FIG. 3, 3a shows a window including a Log gamma setting menu item 310. When the user issues an instruction to select and execute (decide) the Log gamma setting menu item 310 via the operation unit 103, the controller 130 causes the display unit to display a Log gamma setting menu as indicated by 3b.

The Log gamma setting menu window includes a setting item 311 for use/nonuse of Log gamma and setting items for other settings accompanying Log gamma (in this case, use/nonuse of view assist (viewing LUT)). In FIG. 3, 3b indicates the nonuse (Off) state of Log gamma. When the user issues an instruction to select and execute (decide) the setting item 311 via the operation unit 103, the controller 130 switches the content of the setting item 311 to "On" as indicated by 3c.

The controller 130 sets Log gamma in gamma characteristics (input-output characteristics) used by the Cγ processing unit 215 and the Yγ processing unit 222. In addition, the controller 130 invalidates image correction functions which influence the tone characteristics or contrast of an image (change the tone characteristics or contrast) by, for example, changing settings for predetermined functional blocks or invalidating their operations. Furthermore, the controller 130 invalidates the corresponding setting items on the menu screen so as to inhibit the user from setting image correction functions which influence the tone characteristics or contrast of the image.

Although it is possible to exemplify, as methods of invalidating setting items, the operation of hiding setting items and the operation of disabling the selection of setting items while graying out them. However, the present invention is not limited to them. In FIGS. 3, 3d and 3e show a specific example of the latter case. Referring to 3d, a setting item 312 for Auto Tone Correction (automatic tone correction function) and a setting item 313 for Highlight tone priority are grayed out. Auto Tone Correction (automatic tone correction function) is a function of performing automatic tone correction processing by using a tone curve or the like set in accordance with the luminance of an image. Highlight tone priority is a function of performing dynamic range expansion processing for improving the tone gradation on the high-luminance side. In addition, the controller 130 invalidates the functions and hence displays "OFF" as setting contents. That is, when invalidating image correction functions which influence the tone characteristics or contrast of an image, the controller 130 changes set values concerning the associated setting items into values indicating invalid states.

Referring to 3e, a setting item 314 for Picture Characteristics (image characteristics) and a setting item 315 for a multiple exposure function are grayed out. Picture Characteristics (image characteristics) are a function of performing image correction processing corresponding to a scene by a combination of enhancing hue or saturation, expanding the dynamic range, blurring a background, performing gamma characteristic or knee correction, changing the first to third matrices, and the like. The multiple exposure function is a function of combining the images obtained by a plurality of times of shooting.

Figure 4:
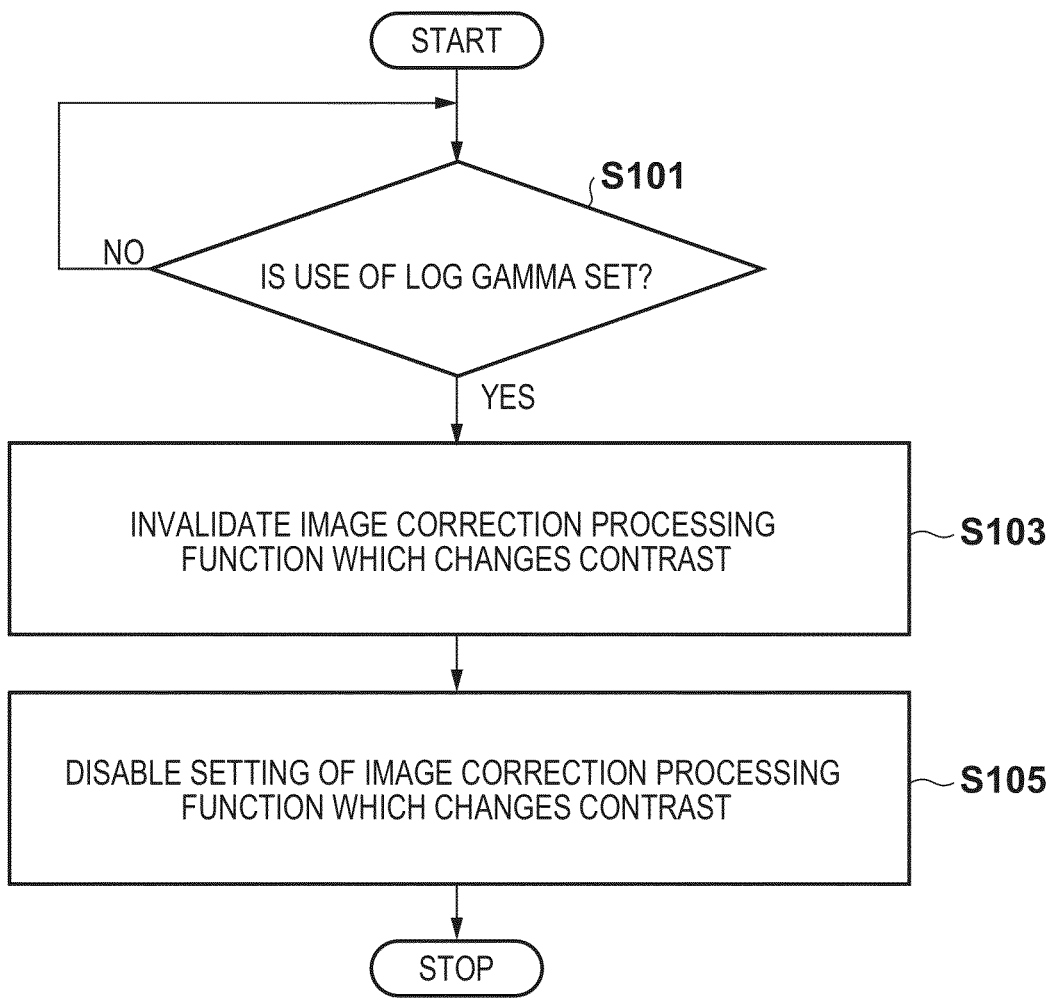
FIG. 4 is a flowchart for explaining the operation of a controller in the embodiment of the present invention.

The flowchart of FIG. 4 shows the operation of the controller 130 described above. In step S101, the controller 130 determines whether the use of Log gamma is set. If the use of Log gamma is set, the controller 130 controls internal functional blocks in step S103 to invalidate image correction functions which influence the tone characteristics or contrast of an image. In step S105, the controller 130 disables the setting of the image correction functions which change the tone characteristics or contrast of the image. As described above, the apparatus may be configured to store the contents of setting items at the time of the setting of the use of Log gamma and restore the initial setting contents upon cancellation of the use of Log gamma.

According to this embodiment, the image capture apparatus, which can perform movie shooting by applying Log gamma and apply image correction processing which changes the tone characteristics or contrast of an image, invalidates the image correction processing which changes the tone characteristics or contrast of the image at the time of movie shooing applying Log gamma. This allows the user to avoid image quality degradation due to the application of image correction processing which changes the tone characteristics or contrast of the moving image shot by applying Log gamma without being conscious of whether image correction processing which changes the tone characteristics or contrast of the image is set.

The recording unit 109 may include associated information about Log gamma setting in the additional information of an image file. The associated information includes not only information indicating the setting of Log gamma but also information concerning invalidation setting for image correction processing functions which change tone characteristics or contrast, which have been described in this embodiment. Adding such associated information allows an editing apparatus which performs post-editing to smoothly perform editing processing. For example, the editing apparatus can notify the user, at the time of editing a received file, that, for example, Log gamma has been properly set for the file and no image correction processing unnecessary for post-editing has been applied.

The editing apparatus performs editing operation with standard characteristics such as Cineon LOG. Upon determining, by checking additional information, that a given image has been shot with characteristics other than Log gamma or it is inappropriate to re-convert the image in the file with Cineon LOG, the editing apparatus can warn the user. In contrast to this, upon determining, by checking the additional information, that the image has been shot with Log gamma settings, the editing apparatus can automatically apply CineonLog. In addition, at the time of display operation, upon determining, by checking additional information, that Log gamma has been set, the editing apparatus may display the image recorded with Log gamma to the user without any change or may display a user interface window to make the user apply or select viewing LUT. Alternatively, the editing apparatus may automatically display an image to which viewing LUT has been applied.

Figure 5:
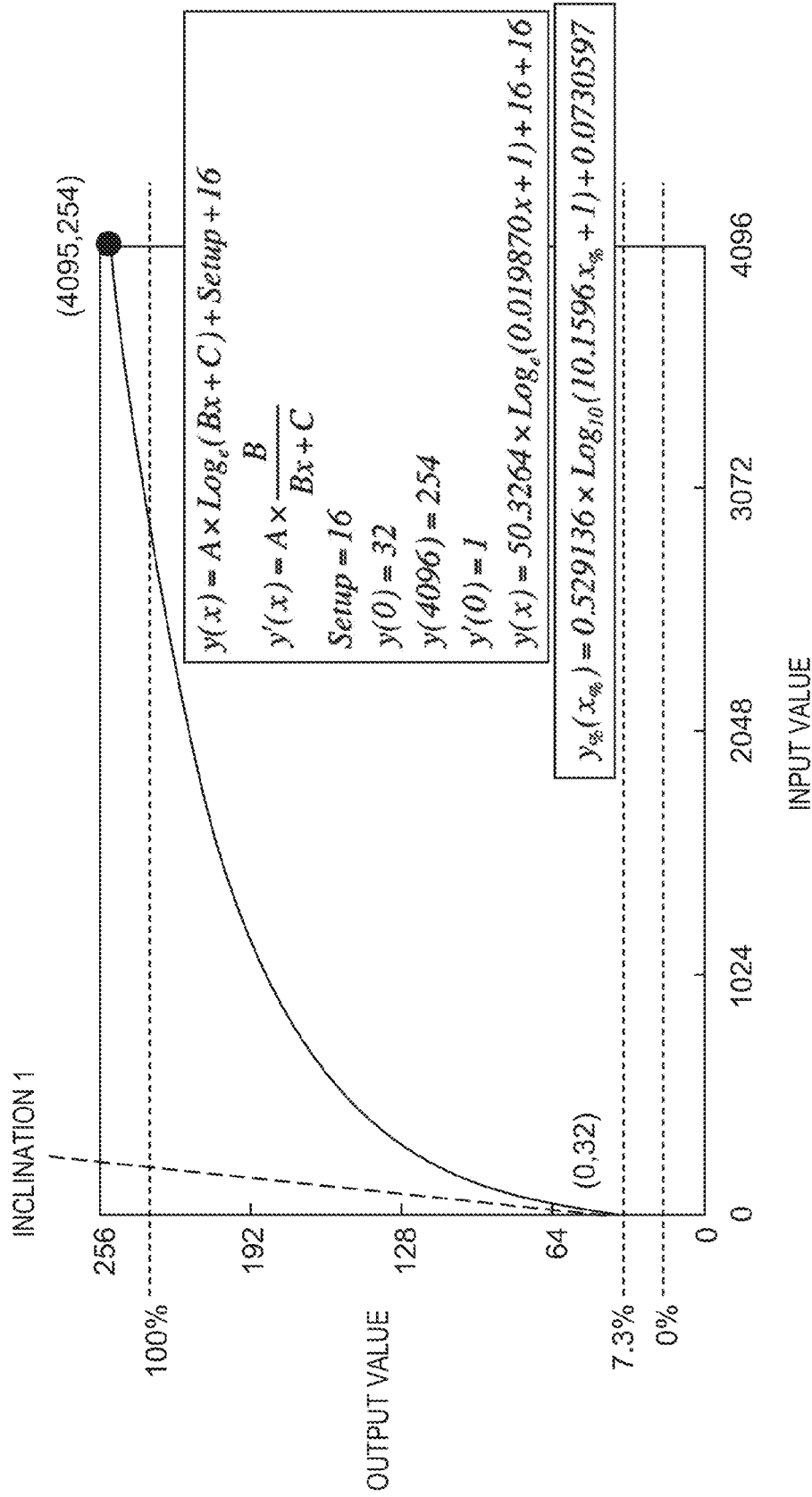
FIG. 5 is a graph showing the input-output characteristics of Log gamma defined by a function in the embodiment of the present invention.

When Log gamma is set, since the contrast is low, the editing apparatus may display a user interface window in a direction to enhance sharpness. That is, the post-editing apparatus is designed premised on the input of an image obtained with Log gamma defined and published by the camera maker as shown in FIG. 5, for example, numerical values or a function as gamma curve characteristics. As in the present invention, if a camera includes not only a general movie recording mode but also a movie recording mode requiring postprocessing, the post-editing apparatus can always handle image having expected characteristics, thereby guaranteeing the image quality of edited images.

Although this embodiment has exemplified BT.709 as a standard color space reproduced by viewing LUT, the present invention does not aim at only such a specific color space. For example, it is possible to apply the BT.601 color space and the color space specified by ACES (Academy Color Encode Specification) proposed by the AMPAS (Academy of Motion Picture Arts and Sciences) specification. The apparatus may be configured to store a plurality of viewing LUTs corresponding to these color spaces in advance so as to allow them to be selected. In this case, LMT (Look Modification Transform) files describing the contents of image processing are associated with image data or recorded on image data. The first embodiment may be configured to generate an LMT file in the CTL (Color Transform Language) format as the description language proposed by AMPAS (Academy of Motion Picture Arts and Sciences). CTL is an interpreter-type language. This language interprets the instructions described in an LMT file and can apply image processing conforming to the instructions to an input image file. Upon receiving image data in which an LMT file is recorded, the image processing apparatus can execute image processing described in the set LMT file.

The present invention is also implemented by executing the following processing. That is, this is the processing of supplying software (programs) for implementing the functions of the above embodiments to a system or apparatus via a network or various types of storage media and making the computer (or the CPU, MPU, or the like) of the system or apparatus read out and execute the software.

The present invention is not limited to the above embodiments and various changes and modifications can be made within the spirit and scope of the present invention. Therefore, to apprise the public of the scope of the present invention, the following claims are made.

This application claims priority from Japanese Patent Application No. 2012-090454 filed Apr. 11, 2012, which is hereby incorporated by reference herein in its entirety.

What is claimed is:

1. An image processing apparatus comprising:
    a conversion unit configured to convert an output from an image sensor with nonlinear input-output characteristics and outputting a converted output;
    an image processing unit configured to apply image correction processing which changes tone characteristics or contrast to the output from said conversion unit; and
    a control unit configured to control enable/disable of said image processing unit in accordance with the input-output characteristics used by said conversion unit,
    wherein said control unit invalidates said image processing unit in a case where said conversion unit is set to use input-output characteristics where an output value logarithmically increases with a linear increase in input value.

2. The image processing apparatus according to claim 1, wherein the image correction processing is at least one of automatic tone correction processing for the output from said conversion unit and image correction processing set by a user.

3. The image processing apparatus according to claim 2, further comprising a display unit configured to cause a display apparatus to display a setting screen for allowing a user to make a setting in the image processing apparatus,
    wherein if said conversion unit is set to use input-output characteristics where an output value logarithmically increases with a linear increase in input value, said control unit controls said display unit so as to disable the user from making a setting associated with the automatic tone correction processing and a setting associated with the image correction processing via the setting screen.

4. The image processing apparatus according to claim 3, wherein if said conversion unit is set to use input-output characteristics where an output value logarithmically increases with a linear increase in input value, said control unit controls said display unit so as not to display an item for making a setting associated with the automatic tone correction processing and an item for making a setting associated with the image correction processing on the setting screen.

5. The image processing apparatus according to claim 3, wherein if said conversion unit is set to use input-output characteristics where an output value logarithmically increases with a linear increase in input value, said control unit controls said display unit to display an item for making a setting associated with the automatic tone correction processing and an item for making a setting associated with the image correction unit on the setting screen in an unselectable form.

6. A method of controlling an image processing apparatus, wherein the image processing apparatus includes: a conversion unit configured to convert an output from an image sensor with nonlinear input-output characteristics and outputs a converted output, and an image processing unit configured to apply image correction processing which changes tone characteristics or contrast to the output from the conversion unit, the method comprising
a control step of controlling enable/disable of the image processing unit in accordance with the input-output characteristics used by the conversion unit,
wherein in the control step, if the conversion unit is set to use input-output characteristics where an output value logarithmically increases with a linear increase in input value, the image processing unit is invalidated.

7. The image processing apparatus according to claim 1, further comprising the image sensor.

8. The image processing apparatus according to claim 1, wherein the image correction processing includes correction processing according to a scene of the output.

9. The image processing apparatus according to claim 1, wherein the image correction processing includes at least one of enhancing hue or saturation, expanding the dynamic range, blurring a background, performing gamma characteristic correction, and performing knee correction.

10. An image processing apparatus comprising:
a conversion unit configured to convert a whole of a captured image with nonlinear input-output characteristics and output a converted image;
an image processing unit configured to apply image correction processing which changes tone characteristics or contrast to a whole of the converted image;
a display unit configured to cause a display apparatus to display a setting screen for allowing a user to make a setting in the image processing apparatus; and
a control unit configured to control a setting item included in the setting screen displayed by said display unit,
wherein, if said conversion unit is set to convert the whole of the captured image with nonlinear input-output characteristics where an output value logarithmically increases with a linear increase in input value, said control unit controls the setting item so as to disable the user from making a setting associated with the image correction processing that effects on the whole of the converted image.

11. A method of controlling an image processing apparatus, wherein the image processing apparatus includes: a conversion unit configured to convert a whole of a captured image with nonlinear input-output characteristics and output a converted image, an image processing unit configured to apply image correction processing which changes tone characteristics or contrast to a whole of the converted image, and a display unit configured to cause a display apparatus to display a setting screen for allowing a user to make a setting in the image processing apparatus, the method comprising the step of
controlling a setting item included in the setting screen displayed by said display unit, and
wherein, if said conversion unit is set to convert the whole of the captured image with nonlinear input-output characteristics where an output value logarithmically increases with a linear increase in input value, said control unit controls the setting item so as to disable the user from making a setting associated with the image correction processing that effects on the whole of the converted image.

12. A non-transitory computer-readable storage medium storing a program, when executed by one or more processors, to cause the one or more processors to function as the image processing apparatus according to claim 1.

* * * * *